United States Patent [19]

Demmel et al.

[11] Patent Number: 5,547,910
[45] Date of Patent: Aug. 20, 1996

[54] METHOD AND SYSTEM FOR CONTROLLING THE ACTIVITY OF A CRYSTALLINE ZEOLITE CRACKING CATALYST

[75] Inventors: Edward J. Demmel, Pitman; Hartley Owen, Belle Mead, both of N.J.

[73] Assignee: Mobil Oil Corporation, Fairfax, Va.

[21] Appl. No.: 827,183

[22] Filed: Feb. 6, 1986

Related U.S. Application Data

[63] Continuation of Ser. No. 258,356, Apr. 28, 1987, abandoned, which is a continuation of Ser. No. 754,220, Dec. 27, 1976, abandoned, which is a division of Ser. No. 595,833, Jul. 14, 1975, abandoned, which is a division of Ser. No. 316,632, Dec. 19, 1972, Pat. No. 3,926,778.

[51] Int. Cl.⁶ .............................. B01J 38/12; B01J 38/20; C10G 11/18
[52] U.S. Cl. .............................. 502/42; 502/43; 208/113; 208/164
[58] Field of Search .............................. 208/120, 164, 208/113; 422/144; 502/41–44

[56] References Cited

U.S. PATENT DOCUMENTS

| | | | |
|---|---|---|---|
| 2,487,132 | 11/1949 | Hemminger | 208/120 |
| 2,526,881 | 10/1950 | Kunreuther | 208/95 |
| 2,902,432 | 9/1959 | Codet et al. | 252/417 |
| 2,906,703 | 9/1959 | Dalla-Valle | 208/149 |
| 3,351,548 | 11/1967 | Payne et al. | 208/120 |
| 3,843,330 | 10/1974 | Conner et al. | 252/417 |
| 3,849,291 | 11/1974 | Owen | 208/120 |
| 3,893,812 | 7/1975 | Conner et al. | 252/417 |
| 3,898,050 | 8/1975 | Strother et al. | 252/417 |
| 3,926,778 | 12/1975 | Owen et al. | 252/417 |
| 4,272,402 | 6/1981 | Mayes | 252/416 |

OTHER PUBLICATIONS

Refining Process Handbook (1986) Hydrocarbon Processing Sep. 1986–pp. 93 and 95.

*Primary Examiner*—Anthony McFarlane
*Attorney, Agent, or Firm*—Ronald A. Bleeker; Malcolm D. Keen

[57] ABSTRACT

A method and system for cracking hydrocarbons and regeneration of the catalyst is described with particular emphasis directed to partially restoring the activity of the catalyst after an initial hydrocarbon conversion use by heat soaking the catalyst at an elevated temperature before use in a second hydrocarbon conversion zone.

This case is a division of application Ser. No. 595,833, filed Jul. 14, 1975.

1 Claim, 1 Drawing Sheet

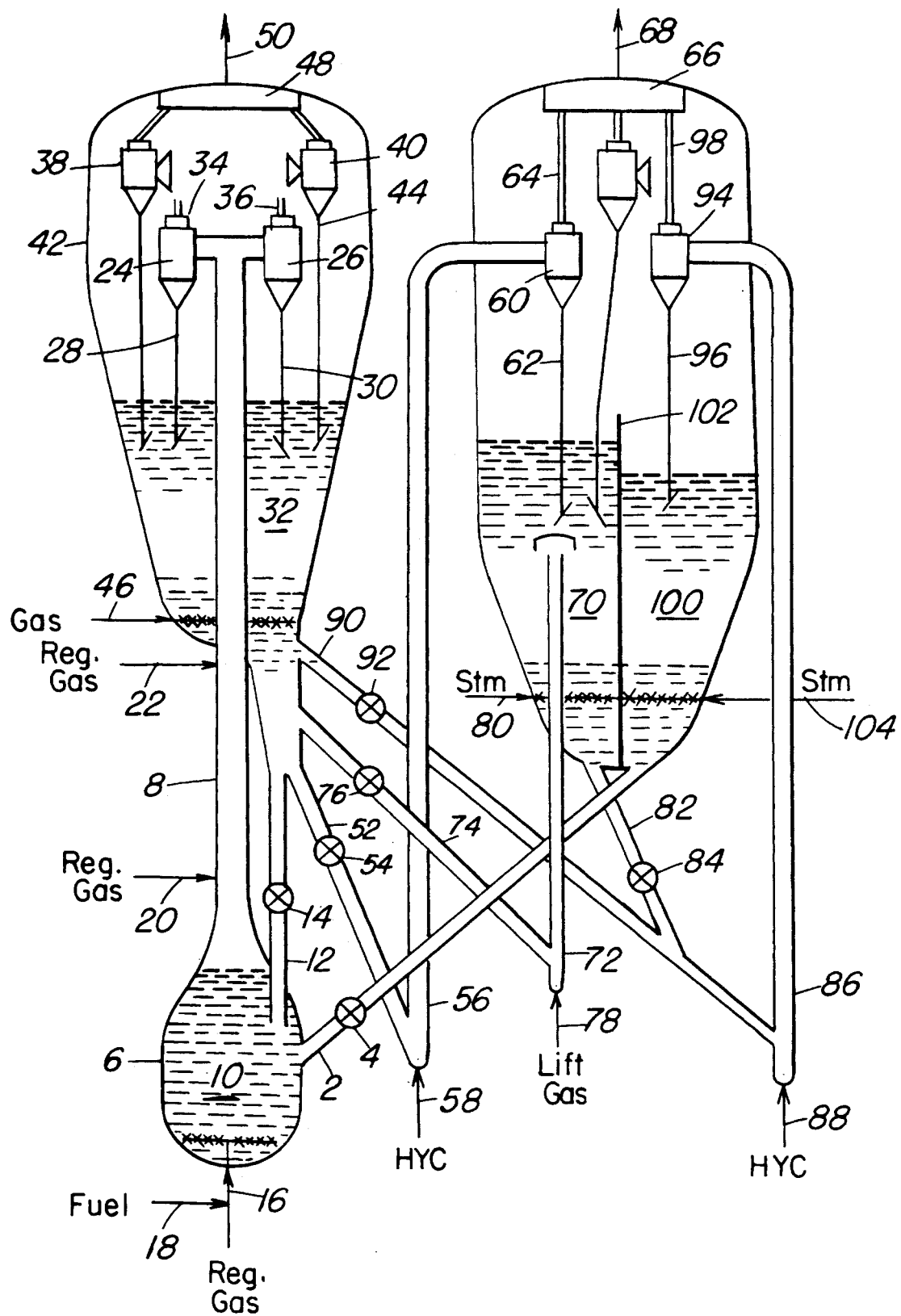

5,547,910

METHOD AND SYSTEM FOR CONTROLLING THE ACTIVITY OF A CRYSTALLINE ZEOLITE CRACKING CATALYST

This is a continuation of application Ser. No. 258,356, filed on Apr. 28, 1981, now abandoned, which is a continuation of application Ser. No. 754,220 filed Dec. 27, 1976, now abandoned which was a division of application Ser. No. 595,883, filed Jul. 14, 1975 now abandoned; which abandoned application was a division of application Ser. No. 316,632, filed Dec. 19, 1972, now U.S. Pat. No. 3,926,778 g ranted Dec. 16, 1975.

BACKGROUND OF THE INVENTION

The field of catalytic cracking and particularly dense or dilute fluid phase catalytic operations have been undergoing progressive development since early 1940. Thus as new experience was gained in operating and design parameters, new catalyst compositions were developed which required a further refinement of known operating and design parameters so as to extract maximum efficiency from the combination operation. With the advent of high activity crystalline zeolite cracking catalyst development, we once again find ourselves in a new area of operation requiring ever further refinements in order to take advantage of the new catalyst activity, selectivity and operating sensitivity. The present invention is concerned with a combination operation which relies upon a combination of catalyst functions mutually contributing to accomplish upgrading of available refinery feed material.

SUMMARY OF THE INVENTION

The present invention is concerned with the conversion of hydrocarbon feed materials in one or more catalytic reaction zones and maintaining the activity of the catalyst employed therein. More particularly the present invention is concerned with the removal of carbonaceous material from the cracking sites of a crystalline zeolite containing cracking catalyst by the combination of catalyst regeneration in the presence of oxygen containing gaseous material and heat soaking of catalyst particles at least partially inactivated by deposited carbonaceous material. In a more particular aspect the present invention involves the regeneration of catalyst comprising crystalline zeolite materials suitable for cracking hydrocarbon feed materials by the combination of riser regeneration of a carbon inactivated catalyst composition in the presence of sufficient oxygen to form combustion products substantially free of carbon-monoxide. Oxygen regenerated cracking catalyst is used in a first hydrocarbon conversion zone under conditions to at least partially deactivate the catalyst by the deposition of carbonaceous material, the partially deactivated catalyst is then heat soaked at a temperature preferably in excess of the temperature of the catalyst as recovered from the first reaction zone whereby deposited carbonaceous material is substantially recovered from the active zeolite cracking catalyst and the zeolite catalyst thus improved in activity is used in a second hydrocarbon conversion reaction zone under elevated temperature cracking conditions. Heat soaking of the catalyst is accomplished in the presence of added freshly regenerated catalyst provided in an amount to achieve a mixed catalyst temperature of about 50° F. above the temperature of the catalyst as recovered from the first reaction zone and preferably 150° F. above that temperature. The mixed catalyst is heat soaked for a duration of at least 2 minutes and preferably at least 5 to 10 minutes or more.

The method and system of this invention is concerned with the finding that heating of a crystalline alumino-silicate cracking catalyst containing fresh deposits of carbonaceous material of cracking will substantially restore the cracking activity of the catalyst. This discovery is of particular interest in, for example, a process design wherein catalyst separated from a first riser reactor with deposited carbonaceous material is combined with freshly regenerated catalyst, heat soaked for a during of time of at least 5 minutes at a temperature of at least 1100° F. and then using the catalyst mixture in a separate second riser reactor. However, in a single riser reactor conversion system wherein separated catalyst is collected, stripped of entrained hydrocarbons and then recycled to a regeneration operation, it is contemplated recycling heat soaked catalyst mixture at least in part to the inlet of the single riser system. The concepts of the present invention are widely applicable to crystalline zeolite cracking catalyst compositions and particularly those employing "X" and "Y" crystalline zeolites when alone or in combination with crystalline zeolites of the ZSM-5 and ZSM-8 type of materials. Another suitable catalyst composition is known as Alderey.

The processing concepts of the present invention are particularly amenable to modern-day low coke producing crystalline aluminosilicate catalyst compositions and such catalyst may be sued to advantage in both the hydrocarbon conversion operation of the process and the catalyst regeneration operation by developing a greater accumulation of carbonaceous deposits on the total mass of catalyst than heretofore obtained before regeneration thereof. The reasons for this observed phenomenon is not readily explained and most unexpected. Furthermore, it has been found that the concepts going to the very essence of the present invention are applicable to other zeolite catalyst mixtures and particularly those comprising a mixture of a crystalline faujasite cracking component with a ZSM-5 type of crystalline material.

The catalyst mixture and/or compositions suitable for use in this invention comprise a mixture of small pore and large pore crystalline aluminosilicate in combination with one another as separate discrete particles and these may be composited from substantially any high activity large pore crystalline zeolite cracking component in admixture with, for example, a ZSM-5 type of catalyst composition. The ZSM-5 type catalyst composition is a relatively small average pore diameter material smaller than, for example, a rare earth exchanged X or Y crystalline zeolite.

The large and small pore crystalline zeolites above discussed may be dispersed within a separate or a common matrix material suitable for encountering relatively high temperatures contemplated in the fluid cracking operation of this invention with its attendant catalyst regeneration operation. The catalyst mixture or composition contemplated for use in this invention will catalyze the conversion of the various components comprising the hydrocarbon feed including normal paraffins to produce for example gasoline as well as LPG types of gaseous materials. Thus the catalysts suitable for this invention have activity for cracking several different kinds and types of hydrocarbons found in gas oil boiling range materials in combination with a very selective cracking of normal paraffins and singly branched hydrocarbons which are restructured and/or upgraded to desired higher boiling components.

The novel process combination of this invention using a catalyst system comprising a mixture of separate catalyst particles or a homogeneous composition of one or more crystalline zeolite components dispersed in an amorphous matrix material wherein the zeolite component or components acts substantially independently as herein defined upon given hydrocarbon components and each catalyst component is relied upon substantially to support the function of the other. Thus it is contemplated employing in the catalyst system of this invention, a large pore crystalline aluminosilicate having a pore size in excess of about 9 Angstroms as a major component with the minor component being a small pore crystalline component having a maximum pore size not exceeding about 9 Angstroms and preferably being less than about 7 Angstroms. On the other hand, the large and small pore zeolites may be used in substantially equal amounts or the smaller pore crystalline zeolite may be in a minor or major proportion. On the other hand, either crystalline zeolite component may be used alone and dispersed in a suitable matrix material as herein defined. The small pore crystalline zeolite is preferably a ZSM-5 type of crystalline material such as that described in U.S. Pat. No. 3,702,886, issued Nov. 14, 1972 or copending application Ser. No. 865,418 filed Oct. 10, 1969. The large pore crystalline zeolite may be any of the now known crystalline aluminosilicates which are suitable for cracking hydrocarbons and providing a pore size in excess of 8 Angstroms. Such a composition has the structure and capability to act upon substantially all the components usually found in a gas oil feed boiling in the range of 500° F. up to 950° or 1100° F. Large pore zeolites of this type are well known and include materials or synthetic faujasite of both the X and Y type as well as zeolite L. Of these materials zeolite Y is particularly preferred.

The crystalline zeolites above identified may be exchanged, combined, dispersed or otherwise intimately admixed with a porous matrix. By porous matrix it is intended to include inorganic and organic compositions with which the crystalline aluminosilicates may be affixed. The matrix may be active or substantially inactive to the hydrocarbon conversion reactions encountered. The preferred porous matrix may be selected from the group comprising inorganic oxides such as clay, acid treated clay, silica-alumina etc. A more complete description of a catalyst composition comprising ZSM-5 type materials which may be used with advantage in this invention and their method of preparation may be found in the application and patent above identified.

In the combination of this invention the small pore crystalline zeolite component of the catalyst is relied upon for promoting new ring formations and/or alkylation thereof in a manner which may be made to increase with reaction severity either by increasing temperatures or by increasing residence time thus encountering a corresponding decrease in alkylation reaction with the ZSM-5 crystalline component.

In yet a further embodiment it is contemplated combining the ZSM-5 type catalyst with a porous matrix as suggested above and an oxidation catalyst suitable for converting carbon monoxide to carbon dioxide. Thus separate particles of catalyst, one comprising ZSM-5 and the oxidation catalyst dispersed in a suitable material are provided with the other comprising catalytically active X or Y faujasite dispersed in a suitable matrix material from a mixture of catalyst particles which are circulated in the system herein discussed for the reasons discussed.

A significant observation contributing to the operational concepts of this invention is the finding that high temperature cracking of the gas oil feed above about 1000° F. does not significantly deactivate the activity and selectivity of a smaller pore ZSM-5 crystalline component combined with the larger pore size cracking component. Furthermore, it has been observed that combining a carbon monoxide oxidation promoter such as chromium oxide with the ZSM-5 catalyst component is not significantly deactivated by coke depositors and thus each component of the catalyst particle can function to independently perform its desired reaction mechanism, the ZSM-5 component for olefin cyclization and the oxidation promoter for conversion of carbon monoxide to carbon dioxide in the regeneration steps of the overall combination herein described. Furthermore, the total mass of catalyst circulated in the system desirably is a heat sink for promoting desired endothermic conversion reactions encountered in the operation. When the oxidation component such as copper, nickel, chromium, manganese oxide or copper chromite is combined with the catalyst as above described a significant heat benefit is realized by virtue of the exothermic conversion of CO to $CO_2$ during regeneration of the catalyst and every opportunity for recovering this heat supply is taken advantage of in the processing concepts herein described. The oxidation component may comprise from one tenth to three weight percent of the catalyst inventory.

The small pore size crystalline zeolite catalyst material preferred in the combination of this invention is preferably of the ZSM-5 type and as such the small pore has a uniform pore size varying because of its elliptical shape from about 5.5 Angstroms up to about 6 and about 9 Angstrom units.

One embodiment of this invention resides in the use of a single porous matrix material as the sole support for the two different pore size crystalline zeolites herein defined. Thus the catalyst may comprise an aluminosilicate of the ZSM-5 type blended with an aluminosilicate having a pore size generally larger than that of ZSM-5 and more usually greater than 8 Angstrom units in a porous matrix as a homogeneous mixture in such proportions that the resulting product contains from about 1% up to about 95% by weight and preferably from about 10 to 50% by weight of total crystalline aluminosilicates in the final composite.

The particular proportions of one aluminosilicate component to the other in the catalyst system or composition herein defined is not narrowly critical and even though it can vary over an extremely wide range it has been found that the weight ratio of the ZSM-5 type aluminosilicate to the large pore size aluminosilicate can range from 1:10 up to 3:1 and preferably should be from about 1:3 to 1:1.

Hydrocarbon charge stocks which may be converted by the combination and method of this invention comprise petroleum fractions having an initial boiling point of at least 400° F. and an end point of at least 600° F. and as high as 950° to 1100° F. The present invention also contemplate the cracking of naphtha boiling in the range of $C_5$ hydrocarbons up to about 400° F. to improve its octane rating in combination with producing significant quantities of LPG type materials which then can be used as part of the charge to the ZSM-5 contact stage of the combination. Hydrocarbons boiling above 400° F. include gas oils, residual oils, cycle stocks, whole topped crudes and heavy hydrocarbon fractions derived by destructive hydogenation processes. These may be used alone or in combination as the first riser reactor hydrocarbon charge.

BRIEF DESCRIPTION OF THE DRAWING

The drawing diagrammatically depicts a processing scheme and arrangements of vessels for effecting hydrocarbon conversion in a combination of riser reactor stages, regeneration of catalyst under dense and dispersed phase conditions and heat soaking of used catalyst between the hydrocarbon conversion stages.

DISCUSSION OF SPECIFIC EMBODIMENTS

Referring now to the drawing, a cracking catalyst comprising a crystalline aluminosilicate such as a faujasite cracking component either alone or in admixture with a ZSM-5 type material dispersed in matrix material of relatively low cracking activity is caused to circulate in a system of hydrocarbon conversion and catalyst regeneration shown in the drawing and herein defined. In the process of the drawing a catalyst contaminated with deposited carbonaceous material of cracking and obtained as hereinafter defined is passed by conduit 2 provided with flow control valve 4 at a temperature within the range of 800° F. up to about 1000° F. and more usually about 950° F. into a vessel 6 which tapers inwardly and upwardly to form a riser regenerator 8 of restricted cross section in the upper portion. In the lower bulb portion 6 of riser 8 the catalyst is retained as a relatively dense fluid bed of catalyst 10 to which hot freshly regenerated catalyst at a temperature in the range of 1200° to 1400° F. may be added by conduit 12 provided with valve 14 to form a heated catalyst mixture to be regenerated. Oxygen containing regeneration gas is introduced by conduit 16 to a bottom portion of the dense fluid mass of catalyst 10 under conditions of temperature, pressure and space velocity to initiate combustion of carbonaceous material and raise the temperature of the mass of catalyst sufficient to substantially complete burning of deposited carbonaceous materials. The mixing of hot regenerated catalyst with spent catalyst to raise the temperature of the spent catalyst can be further assisted by the addition of a combustion supporting fuel as by conduit 18 along with the oxygen containing regeneration gas. The catalyst being regenerated in bed 10 in a relatively dense fluid condition is caused to move upwardly from the bed by combustion gases and carried into the restricted riser section with gaseous products of combustion for discharge from the end of the riser 8 into a combination of cyclone separators 24 and 26 arranged in parallel flow arrangement for separating regenerated catalyst from regeneration flue gases. The regeneration system of this invention is particularly useful and desirable since additional oxygen containing regeneration gas is added to the suspension in riser 8 by one or more spaced apart conduits represented by conduits 20 and 22. The additional oxygen rich gas causes further burning or carbonaceous deposits to be accomplished along with promoting the combustion of formed carbon monoxide (CO) so that the restricted riser section is an effective heat exchange zone of considerable magnitude between catalyst particles and combustion product gases passing therethrough. Thus a more selective temperature control increasing in the direction of flow of the catalyst passing upwardly through the riser from about 900° F. up to about 1200° F. and as high as 1400° F. may be realized by the combination operation above described. The suspension in riser 8 is discharged by a "T" connecting conduit into cyclone separators 24 and 26 on each end thereof. The cyclonic separators are provided with diplegs 28 and 30 for passing separated hot catalyst sequentially to fluid catalyst bed 32 therebelow. Gaseous products of combustion pass overhead from cyclone separator 24 and 26 by open end conduits 34 and 36 discharging into a dispersed phase above a fluid bed of catalyst 32 and thence into cyclone separators 38 and 40 provided with diplegs 42 and 44. Fluidizing gas and/or oxygen containing regeneration gas may be added by conduit 46 to the lower portion of catalyst bed 32 to effect a final burning of carbonaceous material if such is required and desired to further elevate the temperature of the catalyst. Gaseous products of regeneration or flue gases are passed from cyclone separators 38 and 40 to chamber 48 from which they are withdrawn by conduit 50. The hot regenerated catalyst comprising bed 32 being at an elevated temperature in excess of about 1000° F. and as high as 1400° or 1600° F. is withdrawn from a lower portion thereof for distribution and use as discussed above and below.

A stream of hot regenerated catalyst is withdrawn from catalyst bed 32 by conduit 52 provided with flow control valve 54 and passed to the bottom portion of riser reactor 56 to which a suitable hydrocarbon feed is introduced by conduit 58. A suspension is formed with the catalyst and hydrocarbon introduced to the riser providing a catalyst to oil ratio sufficient to obtain a suspension temperature of at least 1000° F. The hydrocarbon feed may be preheated by means not shown up to about 800° F. before admixture with the catalyst. In riser reactor 56, hydrocarbon conversion conditions of temperature in the range of 1000° F. up to about 1200° F. or 1300° F. are maintained and space velocity conditions sufficient to provide a hydrocarbon residence time with the range of a fraction of a second up to several seconds such as 5 to 10 seconds or as high as about 15 seconds. More usually the hydrocarbon residence time with riser 56 will be in the range of 1 to 5 seconds. The hydrocarbon-catalyst suspension passed through riser 56 discharges at the upper end thereof into one or more suitably arranged cyclone separator 60 provided with catalyst dipleg 62. Gasiform hydrocarbon material separated in cyclone 60 is carried overhead by conduit 64 into chamber 66 and thence by conduit 68 to a product fractionation zone not shown.

The catalyst separated by cyclone 60 is conveyed by dipleg 62 to a dense fluid bed of catalyst 70 therebelow. In accordance with this invention hot freshly regenerated catalyst is added to fluid bed 70 by riser conduit 72 in an amount sufficient to achieve a desired temperature increase of at least 50° F. and sufficient to provide a catalyst mix temperature of at least 1000° F. The regenerated catalyst is supplied to riser 72 by conduit 74 provided with flow control valve 76. Lift gas, substantially inert to the environment contacted is introduced to the base of riser 72 by conduit 78. In the dense fluid catalyst bed 70, the catalyst is maintained at a temperature of at least 1000° F. under agitated conditions to provide a heat soaking of used catalyst discharged by dipleg 62 with freshly regenerated catalyst for a time duration of at least about 2 minutes and as high as 15 minutes. During heat soaking of the cracking catalyst it has been found that carbonaceous material deposited on the catalyst is removed or displaced in such amounts to substantially restore the activity of the cracking catalyst to that expected from the crystalline zeolite cracking component of the catalyst. This unexpected and unusual finding is particularly useful when using low coke producing crystalline zeolite cracking catalysts since it has been found that a much greater accumulation of carbonaceous material may be collected on the catalyst before regeneration thereof without undesirably influencing the useful activity of the catalyst for cracking hydrocarbon materials. A stripping and/or fluidizing gas is introduced to the lower portion of bed 70 by conduit 80 to maintain the catalyst during its heat soaking operation in a fluidized condition. The heat soaked catalyst is then withdrawn at an elevated temperature in the range of 1000° F. to about 1300° F. from the bottom of the bed by conduit 82 provided with a flow control valve 84 for passage to the bottom portion of a second riser reactor 86 to which a second hydrocarbon feed is introduced by conduit 88. Additional hot regenerated catalyst may also be withdrawn by conduit 90 provided with flow control valve 92 and mixed with the catalyst in conduit 82 passed to riser 86.

The catalyst and oil introduced to the lower portion of riser 86 is adjusted to form a suspension providing a temperature within the range of 1000° F. to 1250° F. which then moves upwardly through the riser during the conversion of the hydrocarbon charge. The operating conditions in riser 86 may be the same as that employed in riser 56 or more severe by relying upon an increased catalyst to oil ratio within the range of 3 to 20 and a hydrocarbon residence time within the range of 0.5 to 15 or more seconds. For example, a more dense catalyst phase suspension may be employed in riser reactor 86 than employed in riser reactor 56. The suspension passed through riser 86 is separated in cyclone 94 provided with dipleg 96. Separated gasiform hydrocarbon material is removed from separator 94 by conduit 98 and passed to chamber 66 wherein it is combined with hydrocarbons separated by cyclone 60. Catalyst separated in cyclone 94 is passed by dipleg 96 to a separate dense fluid bed of catalyst 100 separated from catalyst bed 70 by a common baffle member 102. It is contemplated maintaining catalyst bed 100 and 70 as concentric cylindrical and annular beds within the lower portion of the vessel with bed 70 being retained preferably as the concentric cylindrical bed of catalyst. Catalyst bed 100 is stripped with stripping gas such as steam introduced by conduit 104. Stripped catalyst is withdrawn from catalyst bed 100 and conveyed by conduit 2 to catalyst regeneration as defined above.

A further embodiment of this invention is concerned with utilising a dual function catalyst such as a "Y" faujasite crystalline zeolite in conjunction with a ZSM-5 type of crystalline material to provide the capability of internally controlling to some considerable degree the activity level of each of the separate zeolite components. For example, varying the temperature and time of heat soaking the catalyst apparently yields a higher activity for the "Y" faujasite component. On the other hand, since the ZSM-5 type component lays down very little coke by comparison it inherently retains much more of its initial cracking activity. Thus using no heat soaking between stages or after the first stage will maximize the activity of the ZSM-5 component in the second riser. The amount of activity would be proportional to the ratio of recycled to freshly regenerated catalyst. Reheating the catalyst after a first stage of cracking to a very high temperature such as about 1300° F. before or concurrent with stripping will operate to reactivate the "Y" faujasite component more and thus result in a higher activity in relation to the ZSM-5 type component.

EXAMPLE

A "Y" faujasite crystalline zeolite containing cracking catalyst was coked for one minute at 925° F., at a 6 weight hourly space velocity using a 10 catalyst to oil ratio with a gas oil feed boiling from 460° to 900° F. of 22 API gravity. The catalyst thus coked had a cracking activity of about 27.9. Determination of the catalyst cracking activity was obtained by contacting the catalyst with a Light East Texas Gas Oil (LETGO) at 850° F., 2 catalyst/oil ratio, 6 weight hourly space velocity.

The spent catalyst of 27.9 activity was stripped with nitrogen at 925° F. resulting in a catalyst with an activity of 34.3 as determined by LETGO test above defined.

The stripped catalyst was then heat soaked for 10 minutes at 1100° F. and tested for activity. The activity determined by the above recited LETGO test was 38.9. It is clear from the above that heat soaking of a crystalline zeolite containing catalyst used for cracking gas oil can restore its activity far beyond that obtained by high temperature stripping of the catalyst above. The activity of a stabilized "Y" sieve cracking catalyst after regeneration is usually in the range of 40 to 45.

Having thus provided a general discussion of the invention and provided specific examples in support thereof, it is to be understood that no undue limitations are to be imposed by reason thereof except as defined in the following claims.

We claim:

1. A process for regenerating spent fluidizable catalyst particles contaminated with carbonaceous deposits comprising the steps of:

(a) introducing spent catalyst particles and hot regenerated catalyst particles from a secondary regeneration zone into a stream of oxygen-containing gas and entraining the catalyst particles in the gas stream to produce a dilute phase catalyst particle stream; to oxidize substantially all of the carbonaceous deposits on said spent catalyst particles to gaseous combustion products; the temperature of the hot regenerated catalyst particles being greater than the minimum temperature required to initiate oxidation of the carbonaceous deposits on the spent catalyst particles, and the proportion of hot regenerated catalyst introduced into said gas stream being sufficient to raise the temperature of the dilute phase stream to at least the minimum temperature required to induce oxidation of said carbonaceous deposit;

(b) passing said dilute phase particle stream through an upwardly directed regeneration zone while maintaining regeneration conditions suitable for oxidation of said carbonaceous deposit in said primary zone and oxidizing substantially all of the carbonaceous deposits on said spent catalyst particles to gaseous combustion products in said dilute phase stream in the regeneration zone to regenerate the catalyst particles;

(c) passing said dilute phase stream containing regenerated catalyst particles and gaseous combustion products from the top of said regeneration zone to a fluid bed of regenerated catalyst particles in a secondary regeneration zone connected to the upwardly directed regeneration zone;

(d) introducing an oxygen-containing regeneration gas into the lower portion of the fluid bed to assist in maintaining the fluid bed in a fluidized state and to effect substantially complete combustion of carbon monoxide in the bed;

(e) exhausting the gaseous combustion products from said secondary regeneration zone; said exhausted gaseous products being substantially free of carbon monoxide; and (f) withdrawing hot regenerated catalyst particles from said secondary regeneration zone; said regenerated catalyst particles being substantially free of carbon.

* * * * *